United States Patent [19]
Leu

[11] Patent Number: 5,812,385
[45] Date of Patent: Sep. 22, 1998

[54] QUICKLY RESTARTABLE POWER SUPPLY APPARATUS

[75] Inventor: Fang-Jye Leu, Taipei Hsien, Taiwan

[73] Assignee: Acer Peripherals, Inc., Taiwan

[21] Appl. No.: 840,913

[22] Filed: Apr. 18, 1997

[30] Foreign Application Priority Data

Mar. 8, 1997 [TW] Taiwan .................................. 86102843

[51] Int. Cl.⁶ .................................................. H02M 7/517
[52] U.S. Cl. ................................................................ 363/49
[58] Field of Search .......................................... 363/21, 49

[56] References Cited

U.S. PATENT DOCUMENTS

| | | | |
|---|---|---|---|
| Re. 34,462 | 11/1993 | Whittle | 363/49 |
| 4,236,198 | 11/1980 | Ohsawa et al. | 363/49 |
| 4,370,701 | 1/1983 | Western | 363/49 |
| 5,581,453 | 12/1996 | Ueta et al. | 363/49 |
| 5,703,764 | 12/1997 | Hermann et al. | 363/21 |
| 5,734,564 | 3/1998 | Brkovic | 363/21 |

*Primary Examiner*—Stuart N. Hecker
*Attorney, Agent, or Firm*—Cushman Darby & Cushman, IP Group of Pillsbury Madison & Sutro LLP

[57] ABSTRACT

A quickly restartable power supply apparatus which can quickly restart with a power-saving integrated circuit in power-saving mode by utilizing the reference output signal of the power control circuit as a restarting control signal thereby rapidly restarting the power supply apparatus in power-saving mode with lower circuitry complexity and cost and good reliability. Further, the quickly restartable power supply apparatus can also decrease the power dissipated by the starting resistor by using the reference voltage signal to control the switch control circuit and the second switching means such that after the power supply control circuit is activated, the current in the starting resistor is cut off and no power is dissipated by the starting resistor.

11 Claims, 5 Drawing Sheets

QUICKLY RESTARTABLE POWER SUPPLY APPARATUS

BACKGROUND OF THE INVENTION

1. Field of the Invention

The present invention generally relates to a power supply apparatus for computers, display and other computer peripheral devices, and more particularly, the present invention relates to a quickly restartable power supply apparatus which is appropriate for working with a power-saving integrated circuit (IC) in power-saving mode.

2. Description of Related Art

Recently, switching type power supply devices have been used in computers and computer peripheral devices. In general, a pulse-width modulation controller (PWM controller) is utilized as a power supply control circuit for a switching type power supply. The PWM controllers such as the 3842 IC and 3844 IC series require sufficient voltage and current to start their control functions normally, so a starting circuit is necessary. However, once the PWM controller has started, the energy for activating the PWM controller is supplied by an auxiliary power source. Therefore, the starting circuit becomes a redundant circuit and continuously consumes power.

FIG. 1 shows a circuit diagram of a conventional switching type power supply apparatus; a stabilizing control circuit for stabilizing the output voltage is omitted.

As shown in FIG. 1, a rectifier 1, such as a full-bridge rectifier, rectifies an alternating-current (AC) voltage into a direct current (DC) voltage, and a filter capacitor 2 filters the rectified voltage and reduces the voltage ripple. The rectified and filtered voltage charges a starting capacitor 4 through a starting resistor 3 and thus the starting resistor 3 supplies the rectified and filtered voltage to a power supply control circuit 5 (here, the power supply control circuit is a 3842 controller, for example) After activating the power supply control circuit 5, the power supply control circuit 5 issues a switching signal to a control transistor 6, such as a NMOS transistor. The gate of the NMOS transistor 6 is connected to the power supply control circuit 5.

A power transformer 7 has a primary winding 7a, a secondary winding 7b and a tertiary winding 7c. The primary winding 7a of the power transformer 7 is connected to the drain of the NMOS transistor 6, thereby supplying a rectified and filtered voltage. By switching the MOS transistor 6, a pulse voltage is generated in the secondary winding 7b and the tertiary winding 7c. The pulse voltage generated in the tertiary winding 7c is rectified and filtered by an auxiliary diode 8 and the starting capacitor 4, and its output voltage is supplied to both ends of the power supply control circuit. The pulse voltage generated in the secondary winding 7b is rectified and filtered by an output diode 9 and an output capacitor 10, thereby producing an output voltage.

The operation of the power supply apparatus as shown in FIG. 1 is described as follows. When an AC voltage is supplied to the power supply apparatus, the AC voltage is rectified and filtered into a DC voltage by the rectifier 1 and the filter capacitor 2. The DC voltage charges the starting capacitor 4 through the starting resistor. As the voltage rises at point A, the voltage at point B also rises and is supplied to the power supply control circuit 5. When the voltage at point B exceeds a specific voltage level, the power supply control circuit 5 is activated. For example, if the power supply control circuit 5 is a 3842 controller then the voltage at point B must at least equal 16 V to activate the 3842 controller. The power supply control circuit 5 issues a switching signal to switch (turn on and off) the control transistor 6. Then, pulse voltages are generated in the secondary winding 7b and tertiary winding 7c. The pulse voltage generated in the secondary winding 7b is rectified and filtered by an output diode 9 and an output capacitor 10, and thus a DC voltage is supplied to the other device (not shown). The pulse voltage generated in the tertiary winding 7c is rectified and filtered by a auxiliary diode 8 and the starting capacitor 4, and its output voltage is supplied to both ends of the power supply control circuit 5. That is, the power source of the power supply control circuit 5 is supplied through the starting resistor 3 at the outset when AC voltage is applied to the power supply apparatus. After activating the power supply control circuit, the working voltage for the power supply control circuit is supplied through the tertiary winding 7c of the power transformer 7. However, a current also flows through the starting resistor 3, and electrical power is consumed.

Generally, the input AC voltage specifications of computers and computer peripheral devices are somewhere between 90 V and 264 V. The power loss consumed by the starting resistor can be calculated as follows. Suppose 90 V AC is supplied to the power supply apparatus, after being rectified and filtered, the DC voltage is about 90 V×1.414=127.6 V. A 3842 controller is used as a power supply control circuit 5, and the minimal starting current for the 3842 controller is about 1 mA. Therefore, the maximal resistance of the starting resistor can be $(127.26\ V-16\ V)^2/1\ mA)=111.26$ KΩ. When the AC voltage equals 264 V, the voltage at point A after being rectified and filtered is about 373.296 V (264 V×1.414). After the 3842 controller is activated, the voltage at point B drops to about 10 V. Consequently, the power consumption of the starting resistor 3 is about $(373.296\ V-10\ V)^2/111.26\ KΩ=1.18\ W$. In computers and computer peripheral devices, a power-saving function for decreasing the power consumption of these devices when not in the energized state is desired. The power-saving function should decrease the power consumption to 5 W to 8 W or less, and the power loss (1.18 W) in the starting resistor 3 can not be ignored.

To decrease the power loss consumed by the starting resistor, the U.S. Pat. No. 5,581,453, has disclosed a power supply with a switched starting circuit.

FIG. 2 shows a circuit diagram of a switching power supply apparatus with switched starting circuit; however, a stabilizing control circuit for stabilizing the output voltage is omitted. In FIG. 2, a switch circuit 11 is connected in series with the starting resistor 3 and the power supply control circuit 5. A switch control circuit 12 is applied to control the turn-on and turn-off of the switch circuit 11. Before the power supply control circuit 5 is activated, the switch circuit 11 remains on such that the DC voltage can charge the starting capacitor 4 through the starting resistor 3 for activating the power supply control circuit 5. After activating the power supply control circuit 5, the pulse voltage generated in the tertiary winding 7c is rectified and filtered. The voltage at point B rises, such that the switch control circuit 12 starts to operate. Consequently, the switch circuit 11 is turned off, preventing power dissipation by the starting resistor.

The prior art described above can reduce the power dissipation by the starting resistor, however, it still suffers from some problems, while operating with a power-saving IC in a power-saving mode.

In power-saving mode, the power-saving IC will take control of the power supply. The power-saving IC shuts down the unnecessary power outputs, for example the power output for the horizontal and vertical scanning signals of a monitor, except for a power output with +5 V and 10 mA for the power-saving IC.

To meet the above requirements, one way is to keep the current flows through the starting resistor 3 and the power supply keep operating to allow the power-saving IC to function. In this way, the circuit has a faster power response; however, this increases the circuitry complexity and cost and the power consumption can not be controlled to satisfy the power requirements.

Another way to perform the power-saving function is to obtain the signal for controlling the power supply control circuit from the output voltage of the tertiary winding. In this way, this circuit has lower power consumption but with slower response. Because the starting capacitance 4 is always large such that the discharge time is long, and the speed of restarting the power supply control circuit will be degraded, resulting in an insufficient amount of power being supplied to power saving IC and consequently, erroneous logic functioning.

Consequently, the prior art as depicted in FIG. 2 can not work with power-saving IC under the following requirements: first, the cost and power consumption must be low; and second, the restart speed of the power supply must be fast enough such that sufficient power can be supplied to the power-saving IC to prevent it from malfunctioning.

SUMMARY OF THE INVENTION

In view of the above problems, the objective of the present invention is to provide a quickly restartable power supply apparatus which can quickly restart in power-saving mode by utilizing the reference output signal of the power control circuit as a restarting control signal thereby quickly restarting the power supply apparatus in power-saving mode with reduced circuitry complexity and cost.

Further, another objective of the present invention is to decrease the power consumption of the starting resistor by using the reference voltage signal to control the switch control circuit and the switch circuit such that once the power supply control circuit is activated, the current in the starting resistor is cut off.

To achieve the above objectives, the present invention provides a quickly restartable power supply apparatus which comprises: a rectifier means that supplies a DC voltage source; a control transistor that receives a switching signal and performs turn-on and turn-off operations; a power transformer that minimally consists of a primary winding, a secondary winding, and a tertiary winding, wherein the DC voltage source is applied to the primary winding by the control transistor and the power transformer produces output voltage sources in the secondary and tertiary winding respectively; a power supply control circuit at least with a starting input terminal, a reference output terminal, and a feed-back terminal, wherein when the voltage at the starting input terminal rises to a starting level, the power supply control circuit is activated and outputs the switching signal to the control transistor, and the voltage at the reference output terminal changes from a first voltage level to a second voltage level, and when the feed-back terminal receives a pulse signal, the power supply control circuit will restart, and the voltage at the reference output terminal changes from the second voltage level to the first voltage level; a starting resistor which provide a path for the DC voltage to charge a starting capacitor thereby supplying the voltage for activating the power supply control circuit; a switch circuit connected in series to the starting resistor and the power supply control circuit; and a switch control circuit receiving a voltage signal from the reference output terminal for switching the switch circuit, wherein when the voltage at the reference output terminal shifts from the first voltage level to the second voltage level, the switch control circuit will be turned on thereby turning off the switch circuit, and when the voltage at the reference output terminal is shifted from the second voltage level to the first voltage level, the switch control circuit will be turned off thereby turning on the switch circuit.

BRIEF DESCRIPTION OF THE DRAWINGS

To make the objectives, features, and advantages more obvious and understandable, the present invention is described in detail as follows in accompaniment with the embodiments and drawings.

DETAILED DESCRIPTION OF THE INVENTION

First Embodiment

Figure 3:
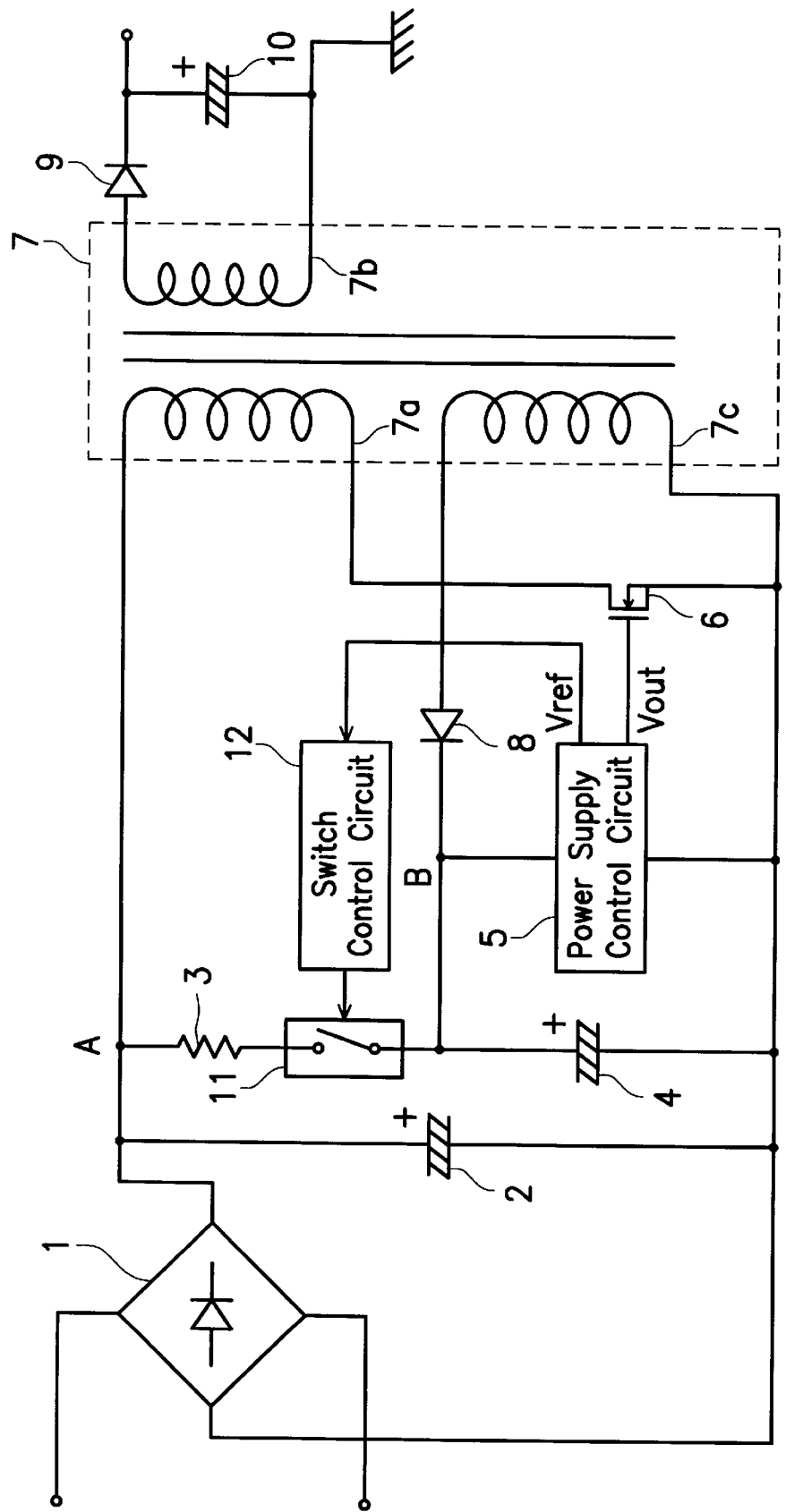
FIG. 3 illustrates a first embodiment according to the present invention.

FIG. 3 illustrates a circuit diagram of the first embodiment according to the present invention; for simplicity, a stabilizing control circuit for stabilizing the output voltage is omitted. Parts similar to those identified with regard to the prior art or conventional art are identified with the same reference numerals and their explanations are omitted. As depicted in FIG. 3, a switch circuit 11 is connected in series between a starting resistor 3 and a power supply control circuit 5, whereby a switch control circuit is used to switch the switch circuit 11. The switch control circuit 12 is controlled according to the reference output signal Vref which is a standard output pin of the commercial 3842 IC and 3844 IC series.

The operation of the power supply apparatus as shown in FIG. 3 is described as follows. When an AC voltage is supplied to the power supply apparatus, the AC voltage is rectified and filtered into a DC voltage by a rectifier means including the rectifier 1 and the filter capacitor 2. At the beginning the switch circuit 11 is turned on, so the DC voltage charges the starting capacitor 4 through the starting resistor 3. As the voltage at point A rises, the voltage at point B rises and is supplied to the power supply control circuit 5. When the voltage at point B exceeds a specific voltage level, the power supply control circuit 5 is activated. Then the power supply control circuit 5 issues the periodical switching signal Vout to continuously switch (turn on and off) the control transistor 6. Then, pulse voltages are generated in the secondary winding 7b and tertiary winding 7c. The pulse voltage generated in the secondary winding 7b is rectified and filtered by an output diode 9 and an output capacitor 10, whereby a DC output voltage is supplied to the other circuit device (not shown). The pulse voltage generated in the tertiary winding 7c is rectified and filtered by a auxiliary diode 8 and the starting capacitor 4, and its output voltage is supplied to both ends of the power supply control circuit 5. Once the power supply control circuit 5 is activated, the reference voltage Vref at the reference output terminal of the power supply control circuit 5 shifts from a first voltage level (for example: 0 V) to a second voltage level (for example: 5 V) such that the switch control circuit 12 is turned-on and thus the switch circuit 11 is turned off. Consequently, the starting resistor 3 will not consume power after the power supply control circuit is activated.

While in power-saving mode, the power-saving IC takes control of the power supply. The power-saving IC cuts off most of the output voltage of the power supply and also sends a control signal to a feed-back terminal (not shown in FIG. 3) of the power supply control circuit 5.

While receiving such control signal, the power supply control circuit 5 performs a reset operation (shut-down). The reference voltage output signal Vref will shift from the second voltage level back to the first voltage level, thereby the switch control circuit 12 will turn on the switch circuit 11, and this will reactivate the power supply control circuit 5. Because the power supply control circuit 5 actually performs periodical restarting operation (reset/reactivate), the power supply control circuit 5 can only produce the switching signal Vout intermittently to switch the control transistor 6. Consequently, a reduced but sufficient amount of power can be transmitted through the secondary winding 7b of the power transformer 7 to keep the power-saving IC function while satisfying the requirement for low power loss.

Second Embodiment

Figure 4:
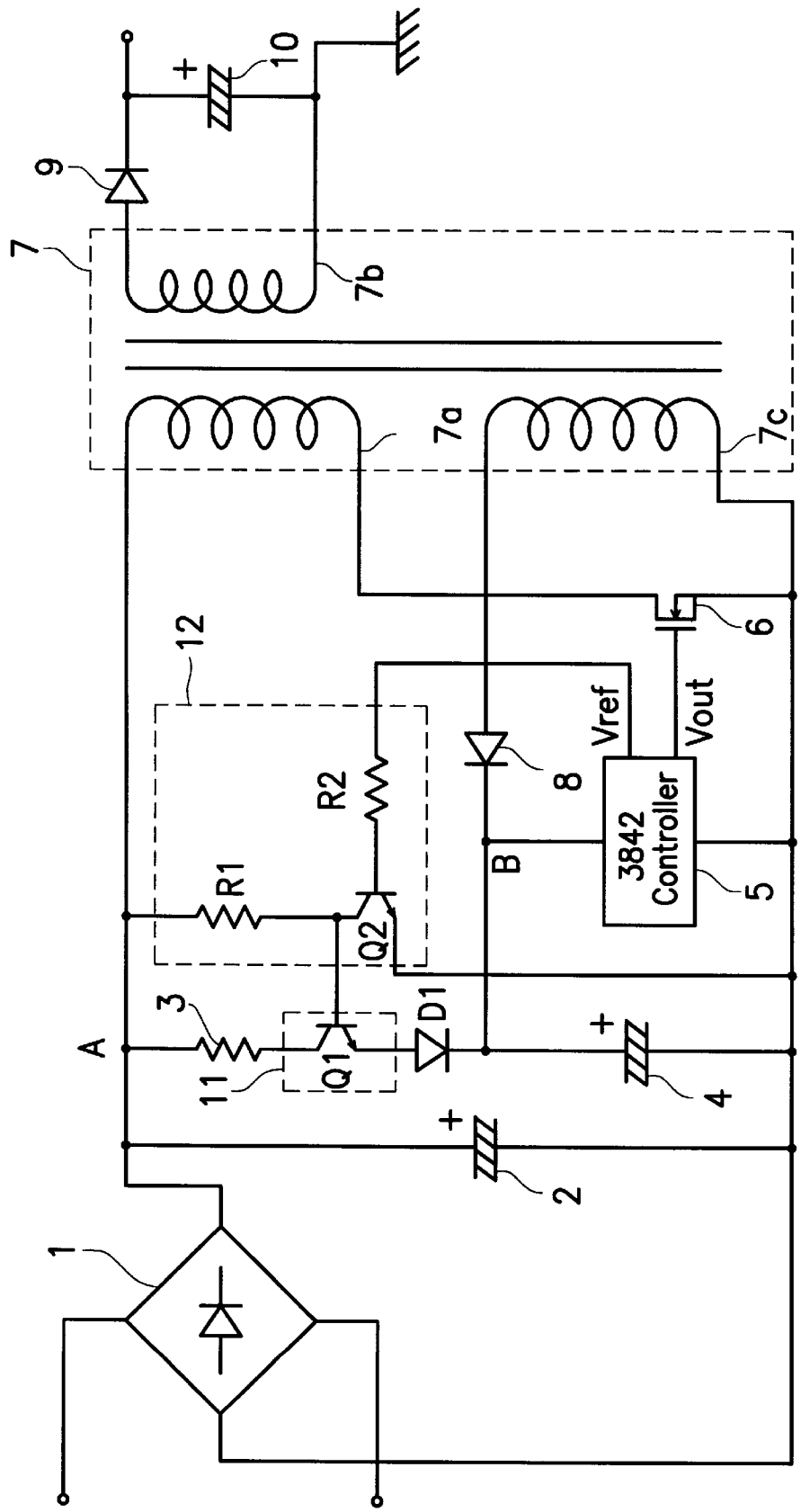
FIG. 4 illustrates a second embodiment according to the present invention.

FIG. 4 illustrates a circuit diagram of the second embodiment according to the present invention; for simplicity, a stabilizing control circuit for stabilizing the output voltage is omitted. Parts similar to those identified with regard to the prior art or conventional art are identified with the same reference numerals and their explanations are omitted. In this embodiment, a 3842 IC controller is used as a power supply control circuit.

As depicted in FIG. 4, a first transistor Q1, for example an NPN transistor, is used as a switch circuit 11 and the first transistor Q1 is connected in series with a protecting diode D1, a starting resistor 3, and the 3842 controller 5. The base of the first transistor Q1 is connected to a DC voltage terminal through a first bias resistor R1. A switch control circuit 12 comprising a second transistor Q2, for example an NPN transistor, and the first bias resistor R1 is used to switch the first transistor Q1. The collector of the second transistor Q2 is connected to the base of the first transistor Q1 and the emitter of the second transistor Q2 is connected to the ground reference of the 3842 controller, and the base of the second transistor Q2 receives a reference output signal Vref from a reference output terminal of the 3842 controller 5 through the second bias resistor Q2.

The operation of the power supply apparatus mentioned above is described as follows. At the outset, the voltage in the starting capacitor 4 is 0 V, and the 3842 controller 5 is not activated so the reference voltage output Vref is 0 V and the second transistor Q2 is in an off state. When an AC voltage is fed into the power supply apparatus, the AC voltage is rectified and filtered to obtain a DC voltage by a rectifier means comprising a rectifier 1 and a filter capacitor 2. The first transistor Q1 is turned on by the DC voltage through the first bias resistor R1. Therefore, the DC voltage charges the starting capacitor 4 through the starting resistor 3, the first transistor Q1, and the protecting diode D1. As the voltage at point A rises, the voltage at point B, which is the starting input terminal of the 3842 controller also rises and is supplied to the 3842 controller 5. When the voltage at point B reaches 16 V (because the starting voltage for the 3842 controller is about 16 V), the 3842 controller 5 is activated. While the 3842 controller 5 is activated, it issues the switching signal Vout to continuously switch (turn on and off) the control transistor 6. Then, pulse voltages are generated in the secondary winding 7b and tertiary winding 7c. The pulse voltage generated in the secondary winding 7b is rectified and filtered by an output diode 9 and an output capacitor 10, whereby a DC output voltage is supplied to the other circuit device (not depicted in FIG. 4). The pulse voltage generated in the tertiary winding 7c is rectified and filtered by a auxiliary diode 8 and the starting capacitor 4, and the rectified and filtered output voltage is supplied to both ends of the 3842 controller 5. After the 3842 controller 5 is activated, the reference voltage Vref shifts from a first voltage level about 0 V to a second voltage level about 5 V such that the second transistor Q2 is turned on and thus the first transistor Q1 is turned off. Consequently, the starting resistor 3 will not conduct any current—and consume power, after the power supply control circuit is activated. The purpose of the protecting diode D1 is to prevent the base and emitter of the first transistor Q1 from being damaged by high reverse bias voltage of about 16 V while the second transistor Q2 being turned on.

The resistance of the first transistor Q1 is about that of the starting resistor 3 multiplied by the forward current gain $h_{fe}$. In practical, the $h_{fe}$ of the first transistor Q1 is always about 60, and thus about 59/60 ≈98% of the power (1.18 W×98%= 1.16 W) consumed by the starting resistor 3 can be saved.

Further, the signal for controlling the switch control circuit 12 is transmitted from the reference output signal Vref of the 3842 controller and the maximal value of the signal Vref is about 5 V. In the prior art depicted in FIG. 2, the signal for controlling the switching control circuit is obtained from terminal B. Supposing that the prior art also used the 3842 controller as a power supply control circuit, then the switch control circuit would not work before the power supply control circuit was activated. Therefore, the signal for controlling the switch control circuit can not less than 16 V during the starting operation. Further because the components used to form the switch control circuit must have high voltage ratings such that the cost is increased.

Figure 5:
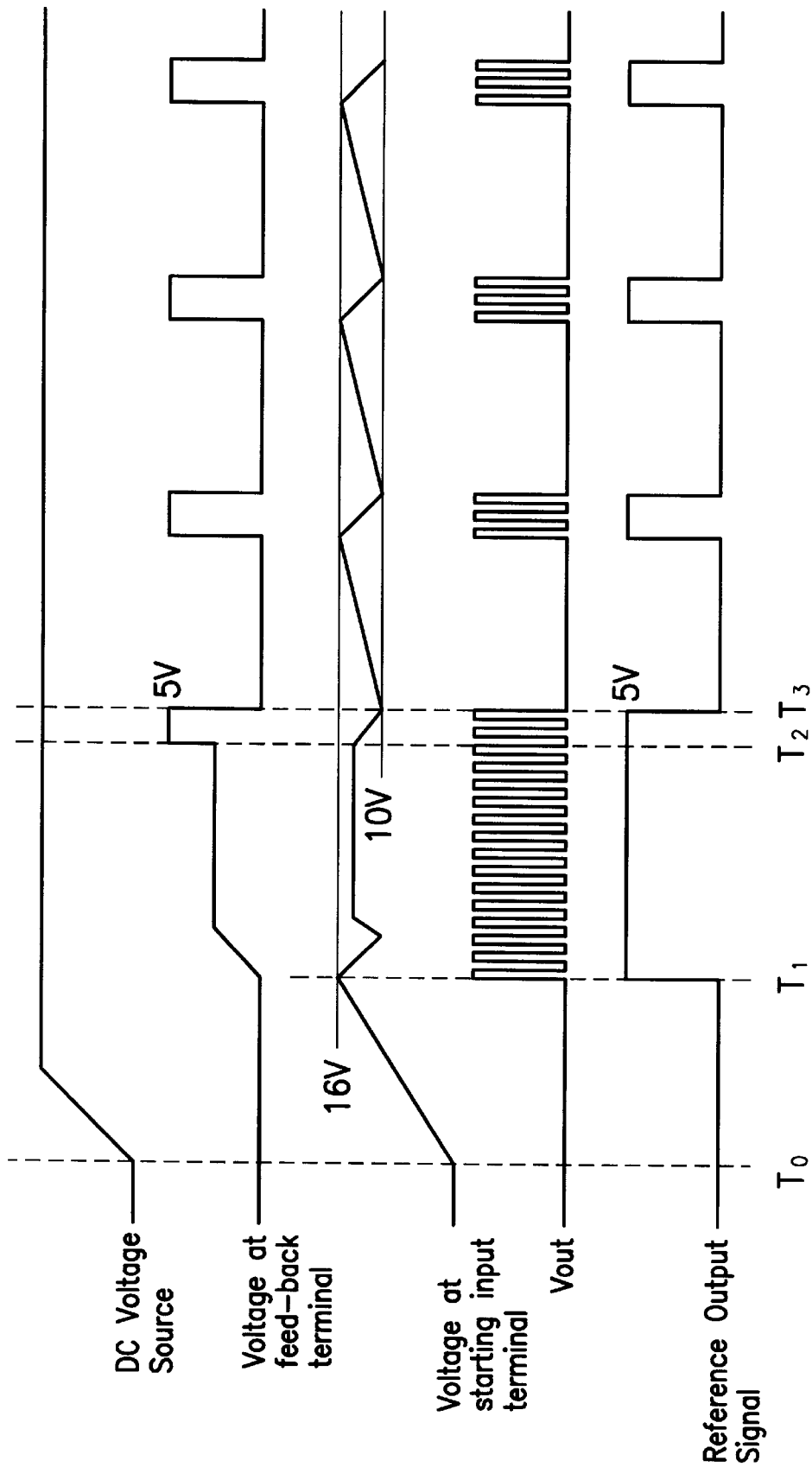
FIG. 5 illustrates the timing chart of the present invention while in power-saving mode.

FIG. 5 illustrates the timing chart of the present invention while in power-saving mode. Referring to FIG. 5, the AC voltage is fed to the power supply apparatus, and the DC voltage source begins to charge the starting capacitor 4, at time $T_0$. When the voltage at the starting terminal of the 3842 controller (terminal B) rises steadily to 16 V at time $T_1$, the 3842 controller is activated. The 3842 controller starts to output the switching signal Vout, and the reference voltage output rises from 0 V to 5 V. In addition, the voltage at terminal B will return to the range between 10 V and 16 V, and the feed-back voltage Vfb at the feed-back terminal of the 3842 controller is within the range of 0–5 V (but less than 5 V).

At time $T_2$, the power supply apparatus begins the power-saving mode operation. The power-saving IC take control of the power supply apparatus, and it issues an off-mode pulse signal to the feed-back terminal of the 3842 controller through a photo-coupler for example. When the voltage in the feed-back terminal of the 3842 controller reaches +5 V, the 3842 controller will be reset and thus the voltage at terminal B begins to drop in order to shut down the 3842 controller. At time $T_3$, the voltage at terminal B has dropped to 10 V (the shut-down voltage for 3842 controller is about 10 V), so the 3842 controller is shut down and the output signal Vout of the 3842 controller disappears. Meanwhile, the off-mode signal received by the feed-back terminal also drops to 0 V, and the reference voltage Vref also drops to 0 V. The second transistor is turned off and thus the first transistor is turned on such that the DC voltage can charge the starting capacitor to activate the 3842 controller again. The above operation is performed cycle by cycle in the power-saving mode. Between the time interval $T_3$–$T_2$, the 3842 controller still continue to issue the switching signal Vout such the power supply apparatus can provide sufficient power for the operation of the power-saving IC.

The restarting speed of the 3842 controller will determine the amount of power provided. The reference voltage output signal Vref of the 3842 controller need not be connected in parallel with a capacitor, so the reference voltage output signal Vref can change its state very quickly and therefore the signal Vref is appropriate for rapidly switching the starting resistor in order to transmit minimal power to the power-saving IC. The switching speed of the signal Vref is almost synchronous with the switching speed of the 3842 controller, so the restarting speed of the power supply apparatus according to the present invention will not be affected by the reference Vref.

Figure 1:
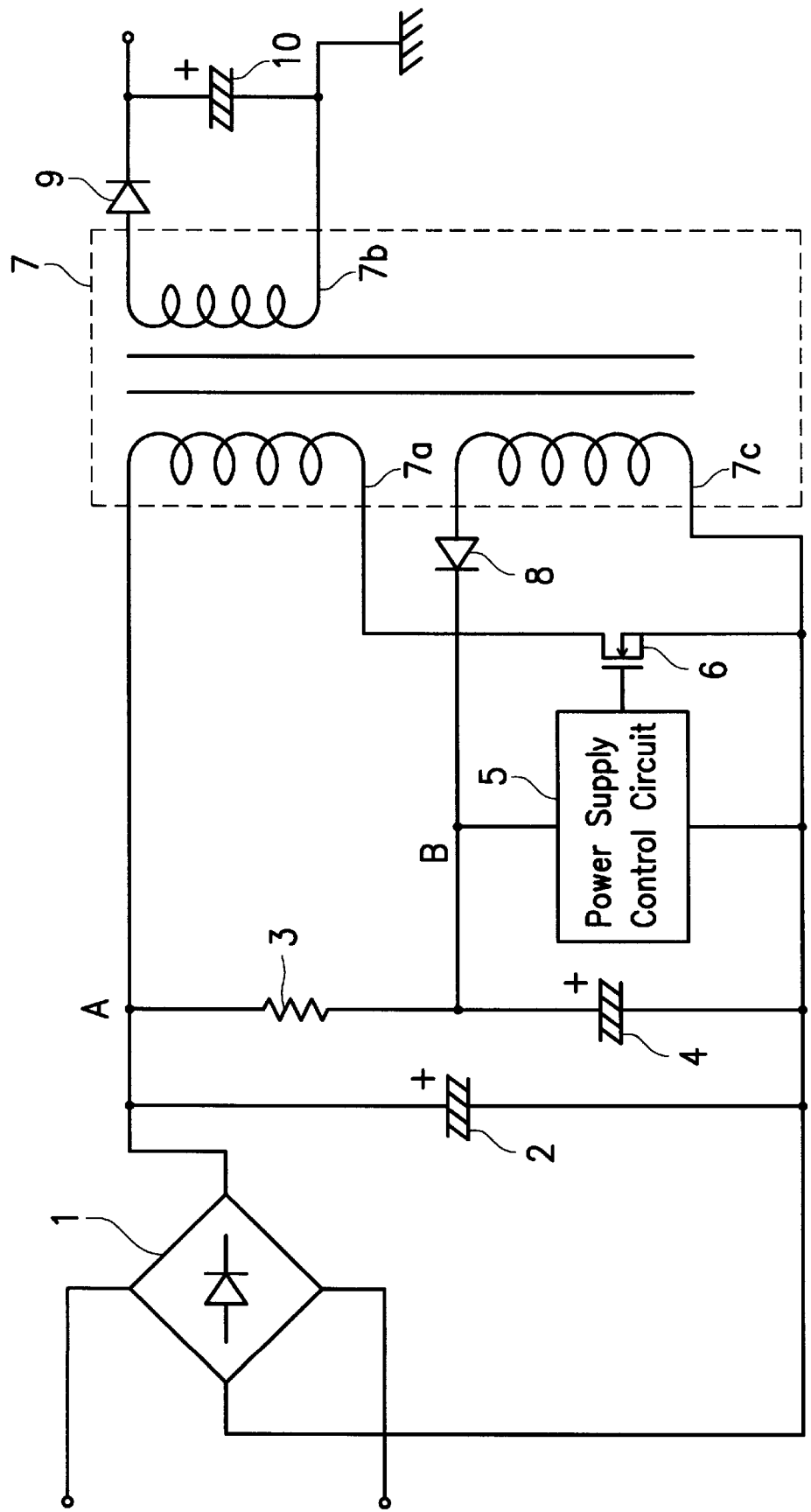
FIG. 1 illustrates a circuit diagram of a conventional switching power supply.
Figure 2:
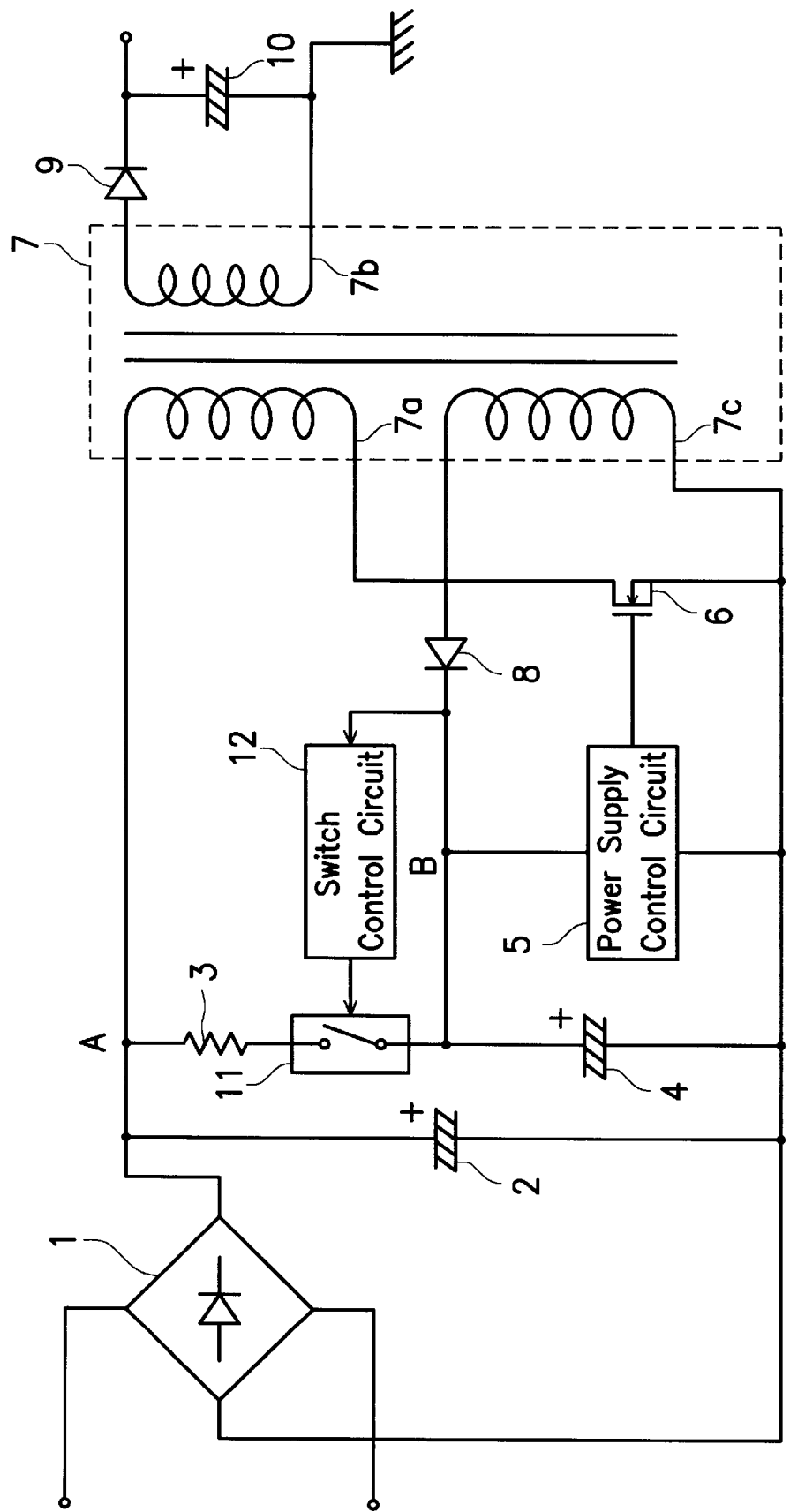
FIG. 2 illustrates a circuit diagram of a switching power supply which can reduce the power dissipation of the starting resistor.

According to the above description, it is obvious that the present invention has the following advantages superior over the prior art depicted in FIG. 2.

First, the present invention utilizes the reference voltage output as the signal for controlling the switching of the starting resistor to reduce the power loss. Most importantly, the present invention can quickly restart with a power-saving IC in power-saving mode. Further, the circuitry complexity and cost is reduced and the reliability is optimized.

Second, according to the present invention, the voltage for controlling the switch control circuit is lower than that of the prior art such that the component costs can be reduced.

Although the present invention has been described in terms of two specific embodiments, it is anticipated that alternations and modifications thereof will no doubt become apparent to those skilled in the art. It is therefore intended that the following claims be interpreted as covering all such alternations and modifications as fall within the true spirit and scope of the invention.

What is claimed is:

1. A quickly restartable power supply apparatus comprising:
   a rectifier means which supplies a DC-voltage source;
   a control transistor which receives a switching signal and performs turn-on and turn-off operations;
   a power transformer which minimally comprises a primary winding, a secondary winding, and a tertiary winding, wherein said DC voltage source is applied to said primary winding by said control transistor and said power transformer produces output voltage sources in said secondary and tertiary winding respectively;
   a power supply control circuit which minimally includes a starting input terminal, a reference output terminal, and a feed-back terminal, wherein when the voltage at said starting input terminal rises to a starting level, said power supply control circuit is activated and issues said switching signal to said control transistor, and the voltage at said reference output terminal shifts from a first voltage level to a second voltage level, and when said feed-back terminal receives a pulse signal, said power supply control circuit will be restarted, and the voltage at said reference output terminal shifts from said second voltage level to said first voltage level;
   a starting resistor which provides a path for said DC voltage to charge a starting capacitor thereby supplying the voltage for activating said power supply control circuit;
   a switch circuit connected in series to said starting resistor and said power supply control circuit; and
   a switch control circuit receiving a voltage signal from said reference output terminal for switching said switch circuit, wherein when the voltage at said reference output terminal shifts from said first voltage level to said second voltage level, said switch control circuit will be turned on thereby turning off said switch circuit, and when the voltage at said reference output terminal shifts from said second voltage level to said first voltage level, said switch control circuit will be turned off thereby turning on said switch circuit.

2. The power supply apparatus as in claim 1, wherein said switch circuit comprises a first transistor whose collector is coupled to said starting resistor, whose emitter is coupled to said starting input terminal of said switch control circuit, and whose base is coupled to said switch control circuit; and said switch control circuit comprises a second transistor whose collector is coupled to the base of said first transistor and a bias resistor connected to said DC voltage source, whose emitter is coupled to the ground side terminal of said power supply control circuit, and whose base is coupled to said reference output terminal of said power supply control circuit.

3. The power supply apparatus as in claim 1, wherein said power supply control circuit can be selected from the controller IC of the 3842 and 3844 series.

4. The power supply apparatus as in claim 2, wherein said power supply control circuit can be selected from the controller IC of the 3842 and 3844 series.

5. The power supply apparatus as in claim 4, wherein said power supply apparatus further includes a protecting diode disposed between the emitter of said first transistor and said starting capacitor.

6. A quickly restartable power supply apparatus comprising:
   a DC voltage source;
   a first switching means which receives a switching signal and performs turn-on and turn-off operations;
   a power transformer which minimally comprises a primary winding, a secondary winding, and a tertiary winding, wherein said DC voltage source applied to said primary winding is controlled by said first switching means and said power transformer produces output voltages in said secondary and tertiary winding respectively;
   a power supply control circuit which minimally includes a starting input terminal, a reference output terminal, and a feed-back terminal, wherein when the voltage at said starting input terminal rises to a starting level, said power supply control circuit is activated and issues said switching signal to said first switching means, and the voltage at said reference output terminal shifts from a first voltage level to a second voltage level, and when said feed-back terminal receives a control signal, said power supply control circuit will be reset and no switching signal issued to said first switching means, and the voltage at said reference output terminal shifts from said second voltage level to said first voltage level;

a path for said DC voltage source to charge a starting capacitor thereby supplying the voltage for activating said power supply control circuit;

a second switching means connected in series to said path and said power supply control circuit; and a switch control circuit receiving a voltage signal from said reference output terminal for switching said second switching means, wherein when the voltage at said reference output terminal is at said second voltage level, said switch control circuit will turn off said second switching means, and when the voltage at said reference output terminal is at said first voltage level, said switch control circuit will turn on said second switching means.

7. The power supply apparatus as in claim 6, wherein said first switching means is a control transistor.

8. The power supply apparatus as in claim 6, wherein said control signal is a pulse signal.

9. The power supply apparatus as in claim 6, wherein a starting resistor which provides said path.

10. The power supply apparatus as in claim 6, wherein said second switching means comprises a first transistor whose collector is coupled to said starting resistor, whose emitter is coupled to said starting input terminal of said switch control circuit, and whose base is coupled to said switch control circuit; and said switch control circuit comprises a second transistor whose collector is coupled to the base of said first transistor and a bias resistor connected to said DC voltage source, whose emitter is coupled to the ground side terminal of said power supply control circuit, and whose base is coupled to said reference output terminal of said power supply control circuit.

11. The power supply apparatus as in claim 6, wherein said power supply control circuit can be selected from the controller IC of the 3842 and 3844 series.

* * * * *